(12) United States Patent
Werner et al.

(10) Patent No.: US 11,429,733 B2
(45) Date of Patent: Aug. 30, 2022

(54) SHARING SECRET DATA BETWEEN MULTIPLE CONTAINERS

(71) Applicant: International Business Machines Corporation, Armonk, NY (US)

(72) Inventors: Klaus Werner, Moetzingen (DE); Jakob C. Lang, Tuebingen (DE); Joerg Schmidbauer, Boeblingen (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 16/191,519

(22) Filed: Nov. 15, 2018

(65) Prior Publication Data

US 2020/0159940 A1 May 21, 2020

(51) Int. Cl.
*G06F 21/00* (2013.01)
*G06F 21/62* (2013.01)
(Continued)

(52) U.S. Cl.
CPC ............ *G06F 21/62* (2013.01); *G06F 9/4406* (2013.01); *G06F 9/45558* (2013.01); *G06F 21/53* (2013.01); *G06F 21/604* (2013.01); *H04L 9/085* (2013.01); *H04L 9/321* (2013.01); *H04L 9/3236* (2013.01); *G06F 21/78* (2013.01); *H04L 2209/04* (2013.01); *H04L 2209/12* (2013.01)

(58) Field of Classification Search
CPC ........ G06F 21/62; G06F 21/53; G06F 9/4406; G06F 9/45558; G06F 21/604; G06F 21/78; G06F 2009/45587; G06F 21/6218; H04L 9/085; H04L 9/321; H04L 9/3236; H04L 2209/12; H04L 2209/04; H04L 9/0891; H04L 9/0643; H04L 9/0894
See application file for complete search history.

(56) References Cited

U.S. PATENT DOCUMENTS 8,862,853 B2 * 10/2014 Sahita ................. G06F 9/45558
711/173
9,928,080 B2 3/2018 Boenisch et al.
(Continued)

FOREIGN PATENT DOCUMENTS

WO WO-2017142577 A1 * 8/2017 ......... H04L 41/0806

OTHER PUBLICATIONS

Mesnier et al., "Object-based storage", IEEE Communications Magazine, vol. 41, Issue: 8, Aug. (Year: 2003).*
(Continued)

*Primary Examiner* — Morshed Mehedi
(74) *Attorney, Agent, or Firm* — Scott Dobson

(57) ABSTRACT

A method for sharing secret data between multiple containers. In response to the initial booting of an operating system instance in a container, a unique operating system identifier is generated for the operating system instance. A grant authority stores the unique operating system identifier in a reserved area of a secure storage device. In response to a request from the operating system instance to access secret data in the secure storage device, the grant authority determines whether the unique operating system identifier is stored in the secure storage device. The operating system instance may be granted access to secret data in the non-reserved area of the secure storage device.

20 Claims, 11 Drawing Sheets

(51) Int. Cl.
*H04L 9/08* (2006.01)
*H04L 9/32* (2006.01)
*G06F 21/53* (2013.01)
*G06F 9/4401* (2018.01)
*G06F 9/455* (2018.01)
*G06F 21/60* (2013.01)
*G06F 21/78* (2013.01)

(56) References Cited

U.S. PATENT DOCUMENTS

| | | | | |
|---|---|---|---|---|
| 9,953,168 | B1* | 4/2018 | Lango | G06F 21/53 |
| 2013/0166848 | A1* | 6/2013 | Miyazaki | G06F 9/468 |
| | | | | 711/143 |
| 2015/0358294 | A1* | 12/2015 | Kancharla | H04L 63/06 |
| | | | | 713/164 |
| 2016/0092243 | A1* | 3/2016 | Boenisch | G06F 9/4408 |
| | | | | 713/2 |
| 2016/0092687 | A1* | 3/2016 | Boenisch | G06F 9/45558 |
| | | | | 713/2 |
| 2018/0069844 | A1* | 3/2018 | Cignetti | G06F 9/45533 |
| 2018/0189092 | A1 | 7/2018 | Sanchez Leighton | |
| 2019/0065214 | A1* | 2/2019 | Kane | G06F 9/4411 |

OTHER PUBLICATIONS

Chandramouli et al., "Cryptographic Key Management Issues & Challenges in Cloud Services", National Institute of Standards and Technology Interagency or Internal Report 7956, https://nvlpubs.nist.gov/nistpubs/ir/2013/NIST.IR.7956.pdf, Sep. 2013, 36 pages.

* cited by examiner

SHARING SECRET DATA BETWEEN MULTIPLE CONTAINERS

BACKGROUND

The present invention relates in general to data processing systems, in particular, to sharing secret data between multiple containers, wherein the secret data are stored in a secure storage device which executes multiple operating system instances simultaneously.

As service providers increasingly host their web services (e.g., web sites) at third party data centers in the cloud, security and key management for these web services hosted at the third party data centers has become an important issue. The crypto operations, such as RSA private key operations, required for secure communications with these web services consume a lot of CPU cycles and computing resources at the servers hosting the web services.

Hardware security modules (HSMs) are secure storage modules as physical computing devices that safeguard and manage keys for strong authentication and provide crypto processing capabilities. Each HSM traditionally comes in the form of a plug-in card or an external device that attaches directly to a computer or network server to offload key management and crypto operations from the server.

SUMMARY

Embodiments of the present disclosure include a method, computer program product, and system for sharing secret data among multiple containers.

In response to the initial booting of an operating system instance in a container, a unique operating system identifier is generated for the operating system instance. A grant authority stores the unique operating system identifier in a reserved area of a secure storage device. In response to a request from the operating system instance to access secret data in the secure storage device, the grant authority determines whether the unique operating system identifier is stored in the secure storage device. The operating system instance may be granted access to secret data in the non-reserved area of the secure storage device.

The above summary is not intended to describe each illustrated embodiment or every implementation of the present disclosure.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
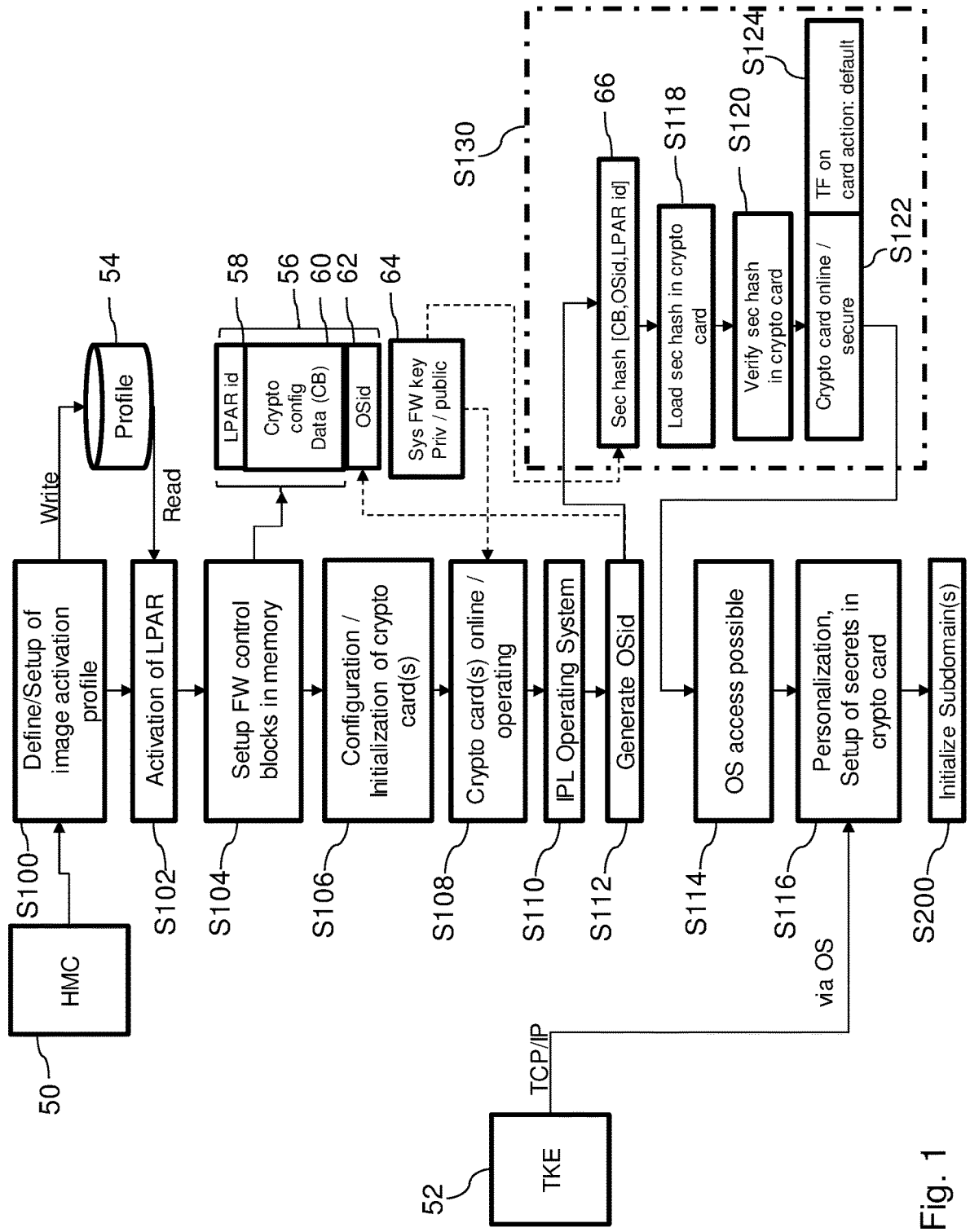
FIG. 1 depicts a flow chart for initialization of a virtual machine with a hardware security module, according to an embodiment of the disclosure.

In the drawings, like elements are referred to with equal reference numerals. The drawings are merely schematic representations, not intended to portray specific parameters of the disclosure. Moreover, the drawings are intended to depict only typical embodiments of the disclosure and therefore should not be considered as limiting the scope of the disclosure.

Data security plays a particularly important role in computer environments where a single set of hardware is used to create multiple virtual machines controlled by multiple parties. Ensuring that sensitive or secret data is only accessed by authorized entities is an ever-evolving process; one that may start with an operating system, or operating system instance in the case of virtual machines, requesting access to the secret data.

In response to a request from an operating system instance to access secret data in the secure storage device, the grant authority may grant the operating system instance access to secret data in the non-reserved area of the secure storage device each time when a request is made.

Alternatively, in response to a request from an operating system instance to access secret data in the secure storage device, and access has not yet been granted to the operating system instance, the grant authority may determine if the operating system identifier is stored in the secure storage device and granting the operating system instance access to secret data in the non-reserved area of the secure storage device in this case only.

Advantageously, the containers may be implemented as virtual machines, each virtual machine being managed by a hypervisor. Further the secure storage device may be implemented as a hardware security module with a volatile or a non-volatile memory. Advantageously, the secure storage device may store different secret data.

According to embodiments, the techniques discussed in the current disclosure may also be proposed for sharing secret data between multiple virtual machines, each virtual machine being managed by a hypervisor, wherein the secret data are stored in at least one domain of a hardware security module. The method for this embodiment further may comprise, in response to an initial booting of an operating system in a virtual machine, the hypervisor generating a unique operating system identifier for the operating system instance executed in the virtual machine; in response to a request to assign a domain to an operating system instance, the grant authority storing the operating system identifier in a reserved area of the respective domain on the hardware security module; and in response to a request from an operating system instance to access secret data in a domain on the hardware security module, the grant authority determining if the operating system identifier is stored in the domain and granting the operating system instance access to secret data in the non-reserved area of the domain.

As used herein, cryptographic may be abbreviated as crypto. The hardware security module may support multiple domains to store different secret data.

Virtualization of a computer system requires a hypervisor, which is the control code that manages resources that are required for multiple independent operating system images. Hypervisors can be implemented as software or hardware. A computer system may comprise either, singularly, or a hybrid of both. A hardware hypervisor may be implemented in firmware as part of the base system, fully virtualizes the system resources, and run without any additional software.

Hypervisors may be designed to enable simultaneous execution of multiple operating systems, providing operating systems with virtual resources of the computer system. Multiple hypervisors can exist on the same computer system.

A hardware hypervisor may allow to create multiple logical partitions on the same physical server or computer system. Each operating system runs in its own logical partition, which may be called a virtual machine. The operating system running in a logical partition may be called a guest, and according to the type of hypervisor by which it is controlled it may be called a level one (L1) virtual machine or a level two (L2) virtual machine.

The method according to an embodiment of the invention enables for sharing secret data between multiple containers, e.g. virtual machines, wherein the secret data may be stored on a hardware security module, the hardware security module possibly supporting multiple domains to store different secret data. The current disclosure serves to prevent unauthorized use or change of secret data, e.g. in hardware security modules, such as crypto cards, in the virtual machine of a virtualized computer system.

Domain sharing may allow logical partitions and/or virtual machines to use the same crypto domain and share secret data. Advantages of domain sharing include, but are not limited to: more efficient resource usage and a correlation of a number of domains to a number of virtual machines, where the number of domains used is smaller than the number of virtual machines.

Due to the techniques described in this disclosure, the unallowed or unauthorized usage of crypto resources with secret data after reconfiguration of the system may advantageously be avoided.

Reconfiguration may be understood as a change of a crypto domain configuration (e.g., a move of crypto domains or secrets from one logical partition to another logical partition). In a normal or planned action, a customer may or may not want to use the secret data after reconfiguration. For this purpose, crypto panels may be prepared to handle this. Domain reset settings on the panel can be 'deselected' or otherwise deactivated. In an unplanned action, (e.g. in response to a failure), a system administrator may erroneously change the configuration of the system. A default reset of secrets and/or other cryptographic materials/data may occur. In an attack against the system, the configuration may be changed to use and/or store crypto data in a different logical partition.

For this purpose, a physical protection of unchanged (e.g., unreset) secret data may be provided in a secure storage device, (e.g. an HSM), which may be realized as a crypto card (e.g., a hardware device accelerating cryptographic operations). Logical protection may be achieved on a virtual machine and OS image boundary level.

The current disclosure also describes securing the configuration of the secure storage device by a secure binding of the secure storage device and its secret data to a logical partition and an OS running in the logical partition in a virtualized system. Configuration of the secure storage device may securely be stored, protected by a system specific key, and maintained in a crypto card. Checking of these configuration data may be performed in every scenario where the configuration might have changed.

Thus, the hardware of the computer system knows which software, (e.g., OS instance) is allowed to use the hardware. The software may be bound to specific hardware. A plurality of logical partitions may be executed, (e.g. a set of 85 logical partitions). Each partition may access processors of the crypto card via a particular domain. Thus the memory of the crypto card may comprise at least one domain for being accessed by an OS instance, but may also comprise a plurality of domains. Changes to the configuration may be allowed only by a trusted key entry device which is controlled by the customer. By means of a secure hash, it is possible to guarantee that requests to change the configuration may be issued by an authorized system. A trusted key entry flag may determine if changes to the system are allowed or not. Each change is authorized by the trusted key entry device. In this way, it is possible to avoid unauthorized changes to the system and changes that may be caused by faults/failures.

The illustrative embodiments described herein provide a method for sharing secret data between multiple containers, wherein the secret data are stored in a secure storage device with a memory. The illustrative embodiments may be used for the method comprising in response to an initial booting of an operating system in a container, generating a unique operating system identifier for the operating system instance executed in the container; in response to a request to assign an operating system instance, a grant authority storing the operating system identifier in a reserved area of the secure storage device; and in response to a request from an operating system instance to access secret data in the secure storage device, and access has not yet been granted to the operating system instance, the grant authority determining if the operating system identifier is stored in the secure storage device and granting the operating system instance access to secret data in the non-reserved area of the secure storage device in this case only. The secure storage device may store different secret data. The illustrative embodiments are sometimes described herein using particular technologies only as an example for the clarity of the description.

FIG. 1 depicts a flow chart for initialization of a virtual machine 10, 12, 14 with a hardware security module 30 according to an embodiment of the disclosure. An exemplary system setup may be seen in FIG. 3.

The method is intended for sharing secret data 40 between multiple containers, being implemented as, for example, logical partitions or virtual machines 10, 12, 14, wherein the secret data 40 are stored in a secure storage device 56 with a memory 32. The memory 32 may advantageously be implemented as a volatile memory or a non-volatile memory. The secure storage device 56 may be adapted to store different secret data 40. According to the embodiment shown, the secret data 40 may be stored in at least one domain 70, 72, 74 of a hardware security module 30, the hardware security module 30 supporting multiple domains 70, 72, 74 to store the different secret data 40.

Cryptographic configuration data 60 of the virtual machine 10, 12, 14 is stored as secure hash 66 in the memory 32.

The secure storage device 56 may be implemented as including a hardware security module 30 with a memory 32. In embodiments, hardware security module 30 may be referred to as a "crypto card."

In response to a corresponding request from the trusted key entry system 52, the computer system 212 sets a domain 70, 72, 74 to either secure or non-secure mode. Further, a unique identifier 62 of the operating system instance is generated. Next, a secure hash 66 for the operating system instance is generated by the firmware of the computer system 212, based on the unique identifier 62 and domain specific cryptographic configuration data 60.

A system firmware key may be used for generating the secure hash 66. A secure hash is generated by signing a hash value with a private key, (e.g. a system firmware key).

In response to a request from the system administrator to configure the secure storage device 56 for use, the secure hash 66 is stored in the domain 70, 72, 74 of the memory 32 when the domain 70, 72, 74 is in non-secure mode, otherwise an error condition is generated.

In response to a request from the system administrator to access secret data 40 stored in the domain 70, 72, 74 of the memory 32, an error condition is generated if a secure hash 66, sent with the request to the secure storage device 56, is not found in the memory 32, or does not match the stored secure hash 66.

Summarizing, the secure hash 66 is generated by the firmware prior to a request from the system administrator to configure the secure storage device 56 for use and/or prior to access secret data 40 stored in the domain 70, 72, 74 of the memory 32, and then handed over to the secure storage device 56.

An error condition may be generated if there is a mismatch of the secure hash 66 stored in the domain 70, 72, 74 of the memory 32 and a secure hash 66 is sent with a request from the system administrator. If there is no secure hash 66 existing for a domain 70, 72, 74, the domain 70, 72, 74 should not be in a secure mode.

A trusted key entry flag 68 may be set in case domain 70, 72, 74 is attributed to the operating system instance via the secure hash 66.

The process flow for initialization of a virtual machine 10 with crypto cards as hardware security modules 30, according to an embodiment of the disclosure, depicted in FIG. 1, starts with defining and/or setting up an image activation profile in step S100, where a number of virtual machines 10, 12, 14 and/or a number of processors is defined. Input to this step may be delivered by the hardware management console (HMC) 50. The profile is written to the storage 54, from which it may be read when activating a virtual machine 10 (LPAR) in step S102. Next in step S104 firmware control blocks are set up in a hardware system area (HSA) 56 for defining memory accesses. HSA 56 may comprise an identifier 58 of the virtual machine as well as cryptographic configuration data 60. Then, at least one crypto card as hardware security module 30 is configured and/or initialized in step S106 in a secure boot process, followed by step S108, where the crypto card 30 is operating. In step S110 an initial program load of an operating system instance is performed, followed by generating an identity (OSid) 62 of the operating system instance in step S112.

The secure binding process S130 is started by generating a secure hash 66 with the OSid 62 and a system firmware key 64 as a certificate, which may be either private or public. The secure hash 66 for the operating system instance is generated based on the identifier 58 of the virtual machine or logical partition, the unique operating system identifier 20, 22, 24, 62 and domain specific cryptographic configuration data 60, 80, 81.

The secure hash 66 is loaded by the firmware into the crypto card 30 in step S118, followed by a verifying process in the crypto card 30 in step S120. Then, the crypto card 30 is initialized in a secure mode in step S122. A trusted key entry flag TF 68 is set to an on-state in step S124, resulting in setting a crypto card action to default action. If the trusted key entry flag TF 68 is in an on-state, no changes to the system are allowed, if the trusted key entry flag TF 68 is in an off-state, changes to the system are allowed. The customer thus may authorize the provider via the trusted key entry flag to perform changes to the system. Authorization is enabled via the trusted key entry device 52.

Having accomplished the secure binding process S130, access to the operating system instance with identity 62 is possible at step S114. By action of a customer via the trusted key entry device 52, which may be a terminal (e.g. a LINUX workstation, transmitted possibly over TCP/IP via the operating system), a personalization and a setup of secret data 40 in the crypto card 30 can be performed in step S116.

If the virtual machines 10, 12, 14 involved are managed by a level two hypervisor (e.g., hypervisor 16 of FIG. 3), subdomains may be initialized in the following step S200, which is explained in detail in the flow chart in FIG. 2.

Figure 2:
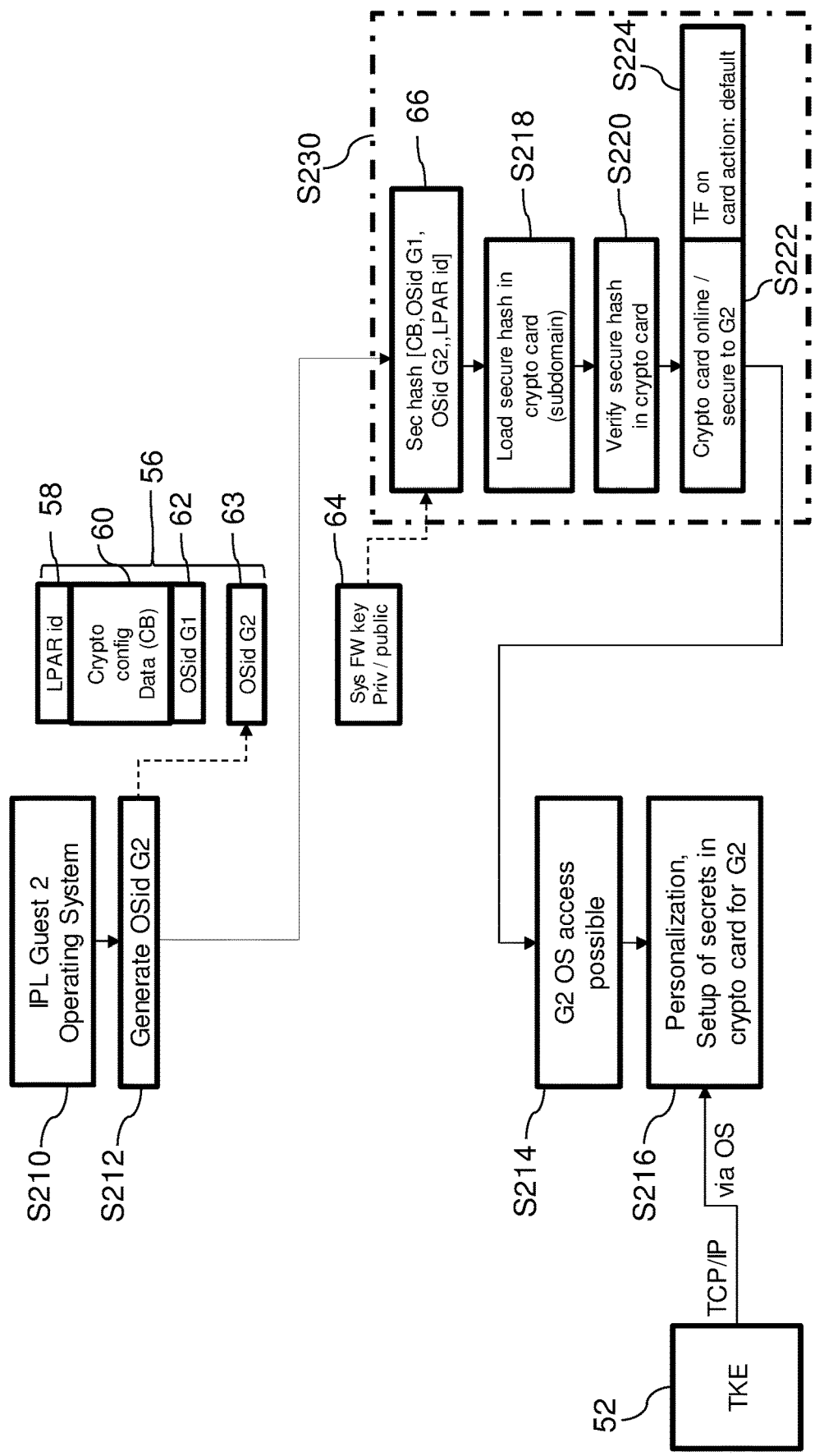
FIG. 2 depicts a flow chart for initialization of a subdomain for a level two virtual machine with a hardware security module, according to an embodiment of the disclosure.

FIG. 2 depicts a flow chart for initialization of a subdomain for a level two virtual machine 10, 12, 14 with a hardware security module 30 according to a further embodiment of the disclosure.

Initializing the subdomain start with step S210, which corresponds to step S110 in the previous flowchart in FIG. 1. In step S210 an initial program load of an operating system instance for the level two virtual machine 10, 12, 14 (Guest 2) is performed, followed by generating an identity (OSid G2) 63 of the operating system instance in step S212. The OSid G2 63 is stored in the secure storage device 56, as well.

The secure binding process S230 is started by generating a secure hash 66 with the OSids 62, 63 and a system firmware key 64 as a certificate, which may be either private or public. The secure hash 66 is loaded by the firmware 18 into the crypto card 30 in step S218, followed by a verifying process in the crypto card 30 in step S220. Then the crypto card 30 is set to online in a secure mode in step S222. A trusted key entry flag TF 68 is set to an on-state in step S224, resulting in setting a crypto card action to default action. If the trusted key entry flag TF 68 is in an on-state, no changes to the system are allowed, if the trusted key entry flag TF 68 is in an off-state, changes to the system are allowed. The customer thus may authorize the provider via the trusted key entry flag to perform changes to the system. Authorization is enabled via the trusted key entry device 52.

Having accomplished the secure binding process S230, access to the operating system instance with identity 63 is possible, at step S214. By action of a customer via the trusted key entry device 52, which may be a terminal (e.g.

a LINUX workstation), transmitted possibly over TCP/IP via the operating system, a personalization and a setup of secret data 40 in the crypto card 30 can be performed in step S216.

Figure 3:
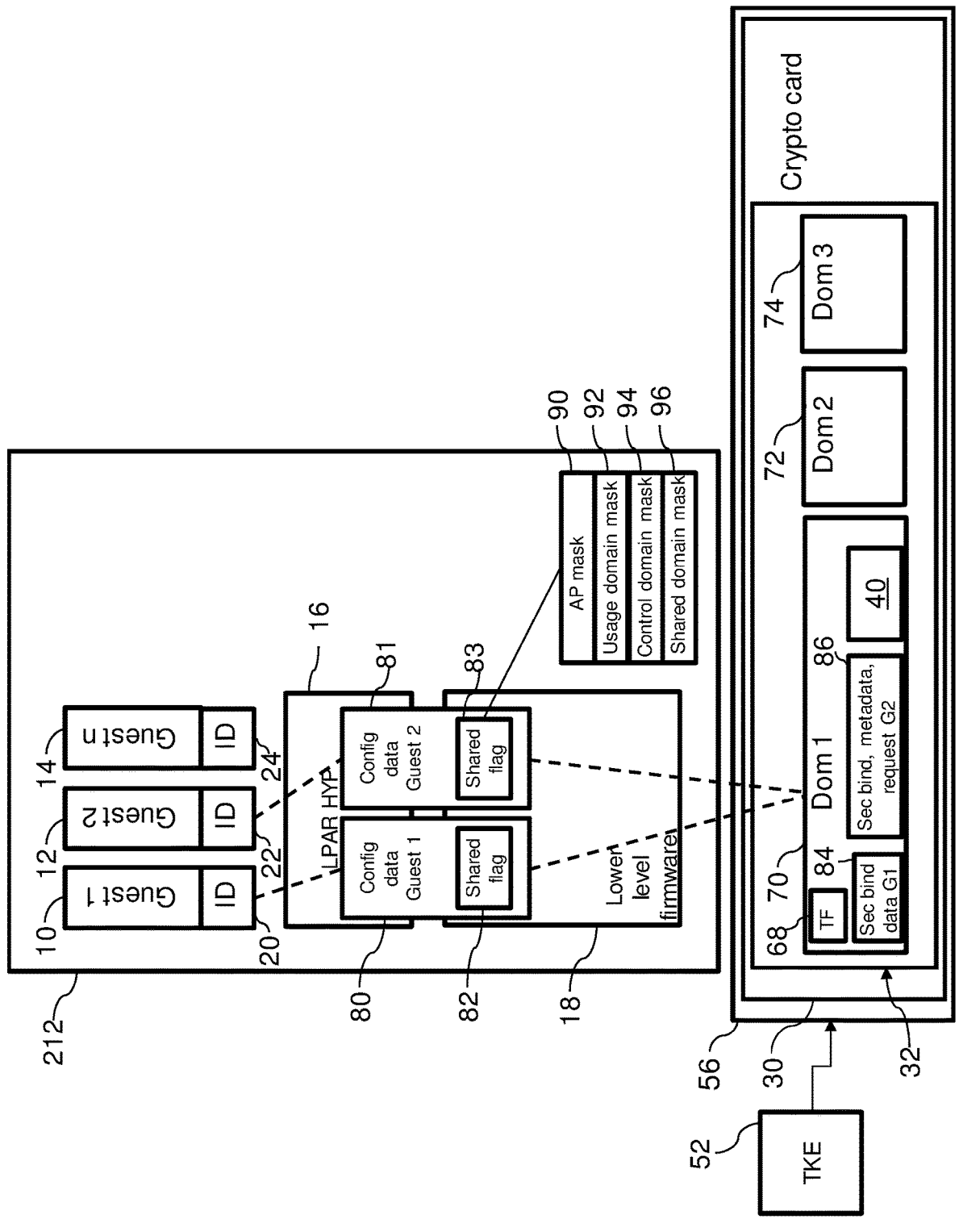
FIG. 3 depicts a setup of virtual machines of a virtualized computer system with an instruction flow to crypto domains on a hardware security module for domain sharing between the virtual machines, according to an embodiment of the disclosure.

FIG. 3 depicts a setup of virtual machines 10, 12, 14 of a virtualized computer system 212 with an instruction flow to crypto domains 70, 72, 74 on a hardware security module 30 for domain sharing between the virtual machines 10, 12 according to an embodiment of the invention.

The containers 10, 12, 14 are implemented as virtual machines 10, 12, 14, each virtual machine 10, 12, 14 being managed by a single hypervisor 16 in the embodiment shown. The secure storage device 56 is implemented as a hardware security module 30 with a memory 32.

The virtual machines 10, 12, 14 are running under operating systems instances with operating system identities 20, 22, 24 are active.

The hardware security module 30, which may be realized as a crypto card, is used as a secure storage device 56 and comprises a memory 32, which may be implemented as a volatile or a non-volatile memory. The memory 32 comprises domains 70, 72, 74, wherein in the first domain 70 secure binding data 84, 86 are stored for two virtual machines 10, 12 in a reserved area of the secure storage device 56 of domain 70. Secret data 40 are also stored in the secure storage device 56 in a non-reserved area. Cryptographic configuration data 60, 80, 81 (FIG. 1) of a virtual machine 10, 12, 14 is stored as secure hash 66 in the domain 70, 72, 74 of the hardware security module 30.

A domain 70, 72, 74 may be attributed to several operating system instances with identities 20, 22, 24.

The hardware security module 30 comprises crypto coprocessors, respectively, as crypto engines. The crypto coprocessors may be configured to the virtual machines 10, 12, 14.

A coprocessor of the hardware security module 30 may be hosting physical crypto domains 70, 72, 74, which are physically and logically secure registers where secret data 40 of each sharing virtual machine 10, 12, 14 can be safely kept. The virtual machine image profile specifies the coprocessor of the hardware security module 30 and the crypto domain 70, 72, 74 to which the logical partition 10, 12, 14 has access. A hardware security module 30 may be implemented as a coprocessor which an identity will be assigned to. This identity together with the identity of the crypto domain 70, 72, 74 will serve for addressing.

Control domains are used to administer the coprocessors of the hardware security module 30. The control domains are defined in an image activation profile.

A hardware management console (HMC) 50 may be used for defining and/or setting up the image activation profile, where a number of virtual machines 10, 12, 14 and/or a number of processors is defined.

The virtual machines 10, 12 are using the crypto domain 72 of crypto card 30 containing a secret data 40. Configuration data 80, 81 of the virtual machines 10, 12 are used by the hypervisor 16 administering the virtual machines 10, 12, 14 of the computer system 212. The configuration data 80, 81 are stored on a lower level firmware 18 of the computer system 212 and used by the hypervisor 16. The configuration data 80, 81 comprise a shared flag 82, 83 where different masks are comprised, e.g. an AP mask 90, a usage domain mask 92, a control domain mask 94 and particularly concerning the embodiment of the invention, a shared domain mask 96.

A separate trusted key entry system 52 may be used to configure the secret data 40 of the operating system instances with identities 20, 22, 24 stored in the domains 70, 72, 74 of the memory 32. Information may be sent via the TCP/IP protocol secured by secure sockets layer/transport layer security (e.g., SSL/TLS).

Secret data 40 are shared between the virtual machines 10, 12, 14, each virtual machine 10, 12, 14 being managed by the hypervisor 16. The secret data 40 are stored in the domain 70 of the hardware security module 30. The hardware security module 30 may advantageously support the domains 70, 72, 74 to store different secret data 40.

According to an embodiment of the invention, in response to an initial booting of an operating system in a virtual machine 10, 12, 14, a unique operating system identifier 20, 22, 24 is generated for the operating system instance executed in the virtual machine 10, 12, 14. In response to a request to assign a domain 70, 72, 74 to an operating system instance, the grant authority 52 stores the operating system identifier 20, 22, 24 in the reserved area of the respective domain 70, 72, 74 on the hardware security module 30. In response to a request from an operating system instance to access secret data 40 in a domain 70, 72, 74 on the hardware security module 30, the grant authority 52 determines if the operating system identifier 20, 22, 24 is stored in the domain 70, 72, 74 and grants the operating system instance access to secret data 40 in the non-reserved area of the domain 70, 72, 74. In response to a request to remove the assignment of an operating system instance from a domain 70, 72, 74, the grant authority 52 deletes the operating system identifier 20, 22, 24 from the reserved area in the domain 70, 72, 74.

A domain 70, 72, 74 is marked as shared by setting a trusted key entry flag 68, also stored in the domain 70 of the secure storage device 56, to a state "add" and marking the domain 70, 72, 74 as being shared in the shared domain mask 96.

For setup of the system the secure binding data 84, 86 are created in firmware 18 and stored in the reserved area in the domain 70, 72, 74 and the shared flag 82, 83 is set up.

Access is granted for an operating system instance to secret data 40 in the non-reserved area of the domain 70, 72, 74 by presenting the operating system identifier 20, 22, 24 to the granting authority 52, wherein the granting authority 52 sets the trusted key entry flag 68 to a state "locked."

For secret data 40 in the domain 70, 72, 74 of the hardware security module 30 being used by a virtual machine 10, 12, 14, a firmware 18 of a computer system 212 and the hardware security module 30 may first verify that the domain 70, 72, 74 is shared and verify the secure binding data 84, 86 on changing cryptographic configuration data 60, 80, 82 of the virtual machine 10, 12, 14.

The firmware 18 of a computer system 212 provides the secure binding data 84, 86 to the hardware security module 30.

Removing the assignment of an operating system instance from a domain 70, 72, 74 may be performed by deleting the secure binding data 84, 86 and removing the secret data 40 from the hardware security module 30 if the operating system instance has been the only user of the secret data 40.

Figure 4:
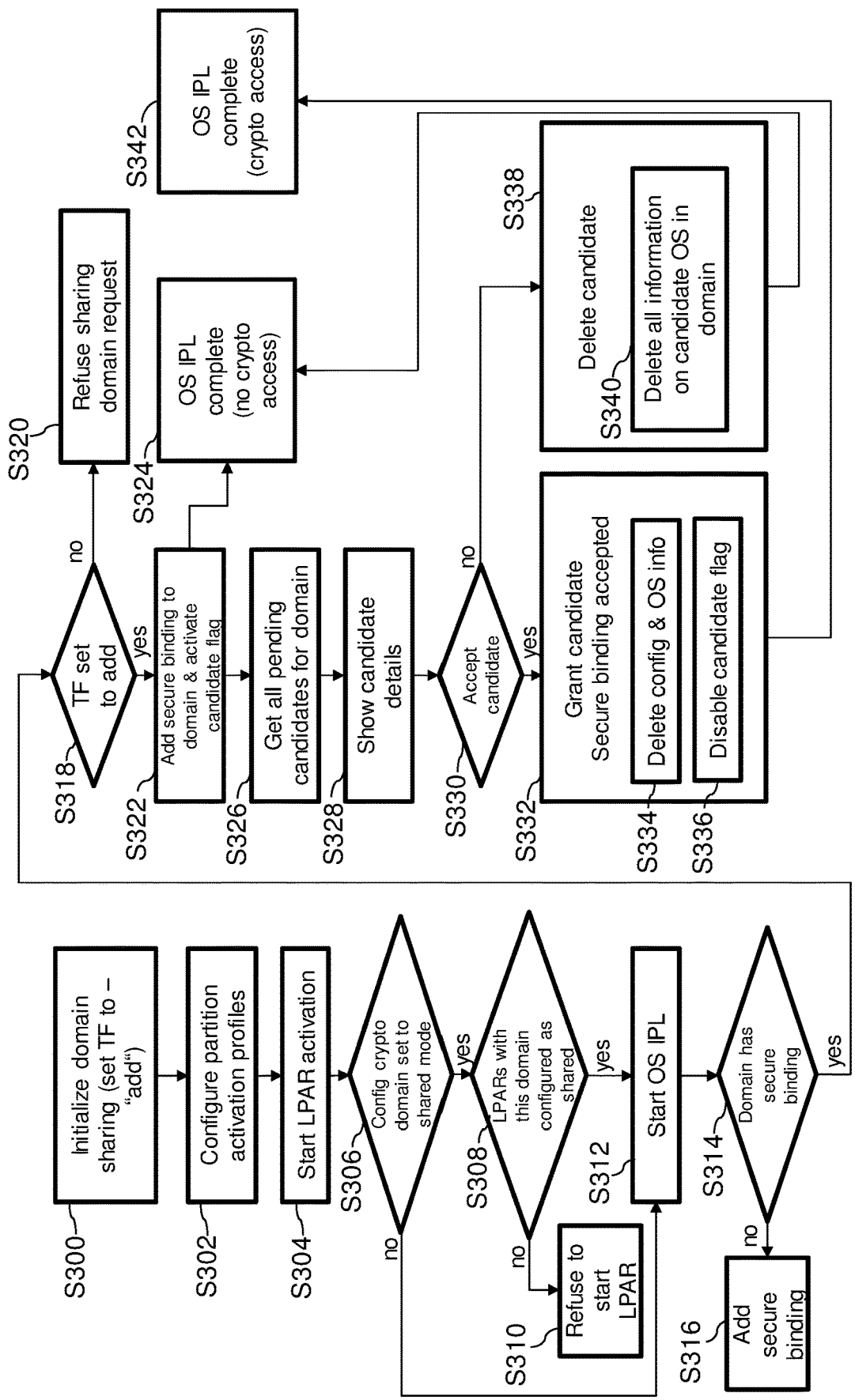
FIG. 4 depicts a flow chart for a high level flow of a secure domain sharing, according to an embodiment of the disclosure.

FIG. 4 depicts a flow chart for a high level flow of a secure domain sharing according to an embodiment of the invention.

First, at step S300, the domain 70 is initialized for being shared by setting the trusted key flag 68 to the state "add." Next, in step S302 virtual machine (partition) activation profiles are configured, followed by activating the virtual machine 10 in step S304. It is checked in step S306 if the configured crypto domain 70 is set to shared mode. If this is not the case, the program flow continues with step S312, where the initial program loading of the operating system instance (OS IPL) is started. Thereafter, it is then checked in step S308 whether all or some previous activated virtual machines 10, 12, 14 assigned to this domain 70 if the domain 70 are configured as shared. If this is not the case, initialization of the virtual machine 10, 12, 14 is refused in step S310. If this is the case, however, the program flow continues with step S312.

Next it is checked in step S314 if the domain 70 has a secure binding. If this is not the case, secure binding is added in step S316. If this is the case, it is checked in step S318 if the trusted key entry flag 68 is set to the state "add." If this is not the case, the request for sharing the domain 70 is refused at step S320. If this is the case, secure binding data is added to the domain 70 and a flag for the candidate virtual machine for crypto access of secret data 40 activated in step S322.

For the case of no crypto access, the OS IPL is complete at step S324.

Next, at step S326, all pending candidate virtual machines for crypto access are searched and the candidate details, e.g. configuration of the virtual machine, OS details, and certificate, are shown in step S328.

If the candidate is accepted in S330, the candidate is granted a secure binding extension accepted, step S332. Configuration and OS information is deleted, step S334, followed by disabling the candidate flag, step S336. The program flow finishes with step S342, OS IPL complete with crypto access.

If the candidate is not accepted in step S330, the candidate is deleted in step S338 by deleting all information of the candidate in the domain 70. The program flow finishes with step S324.

Figure 5:
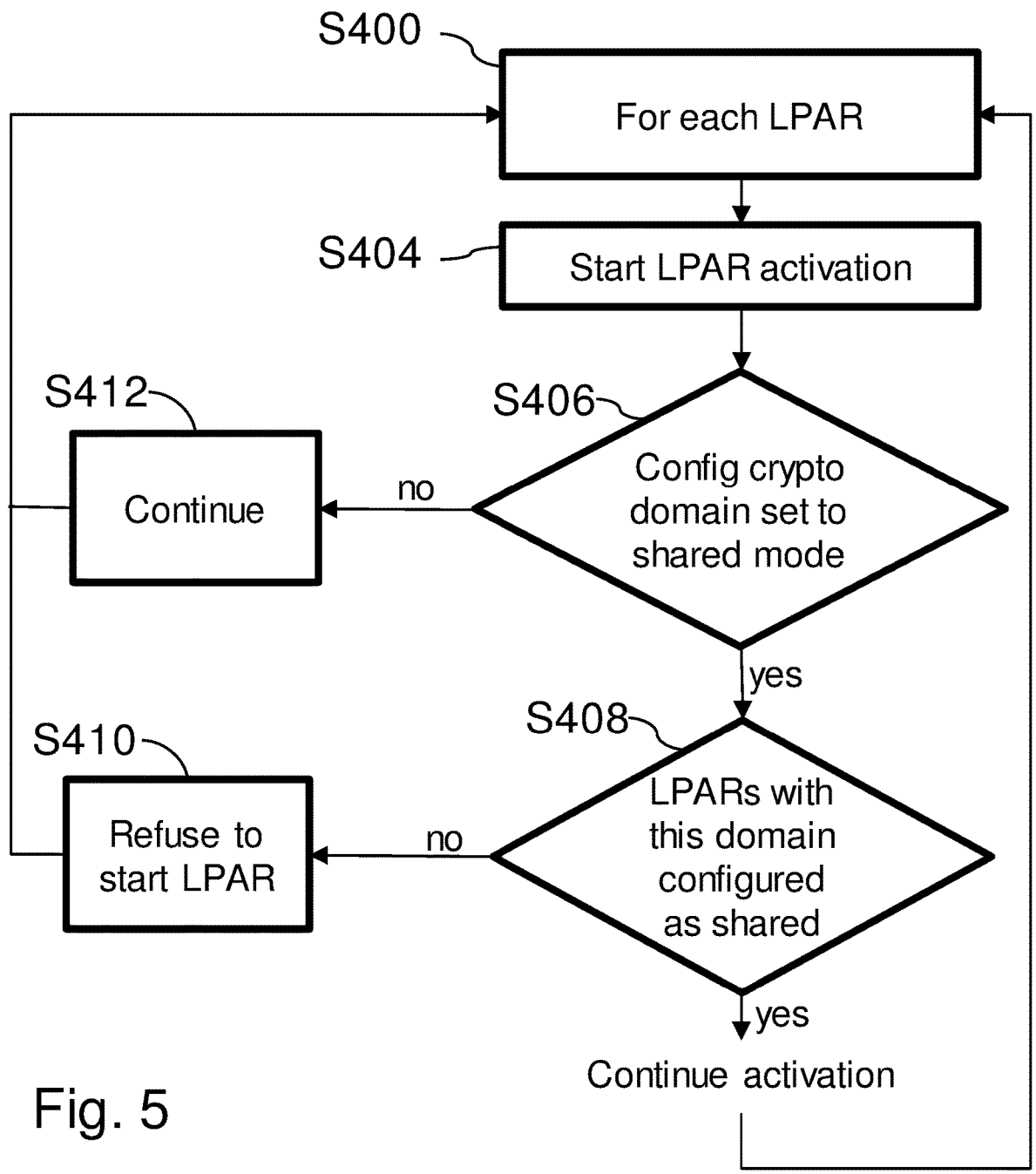
FIG. 5 depicts a flow chart for activating all virtual machines of the computer system for secure domain sharing, according to an embodiment of the disclosure.

FIG. 5 depicts a flow chart for activating all virtual machines 10, 12, 14 of the computer system 212 for secure domain sharing according to an embodiment of the invention.

For each virtual machine 10, 12, 14 (step S400), the virtual machine 10, 12, 14 is activated in step S404. It is checked in step S406 if the configured crypto domain 70 is set to shared mode. If this is not the case, the program flow continues with step S412 with the next virtual machine in the loop S400. If this is the case, it is then checked in step S408 if all or some previous activated virtual machines 10, 12, 14 assigned to this domain 70 if the domain 70 is configured as shared. If this is not the case, initialization of the virtual machine 10, 12, 14 is refused in step S410 and the program flow continued with step S412 with the next virtual machine in the loop S400. If this is the case, the activation of the virtual machine continues followed by the next virtual machine in the loop S400.

Figure 6:
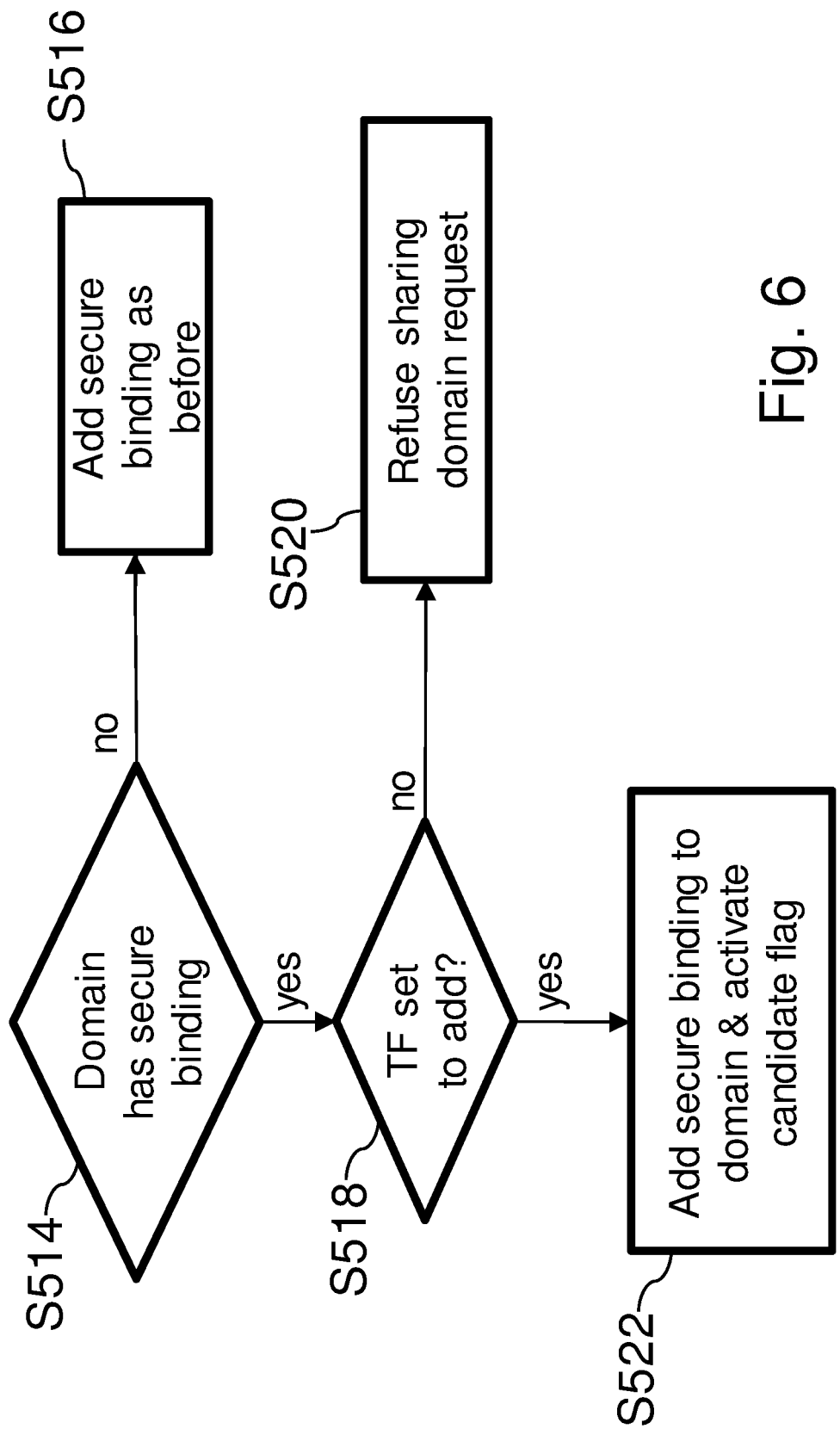
FIG. 6 depicts a flow chart for initial program loading of an operating system for a virtual machine as a candidate for domain sharing, according to an embodiment of the disclosure.

FIG. 6 depicts a flow chart for initial program loading of an operating system for a virtual machine 10, 12, 14 as a candidate for domain sharing according to an embodiment of the invention.

First, it is checked in step S514 whether the domain 70 has a secure binding. If this is not the case, secure binding is added in step S516. If this is the case, it is checked in step S518 if the trusted key entry flag 68 is set to the state "add." If this is not the case, the request for sharing the domain 70 is refused at step S520. If this is the case, secure binding data is added to the domain 70 and a flag for the candidate virtual machine for crypto access of secret data 40 activated in step S522.

Figure 7:
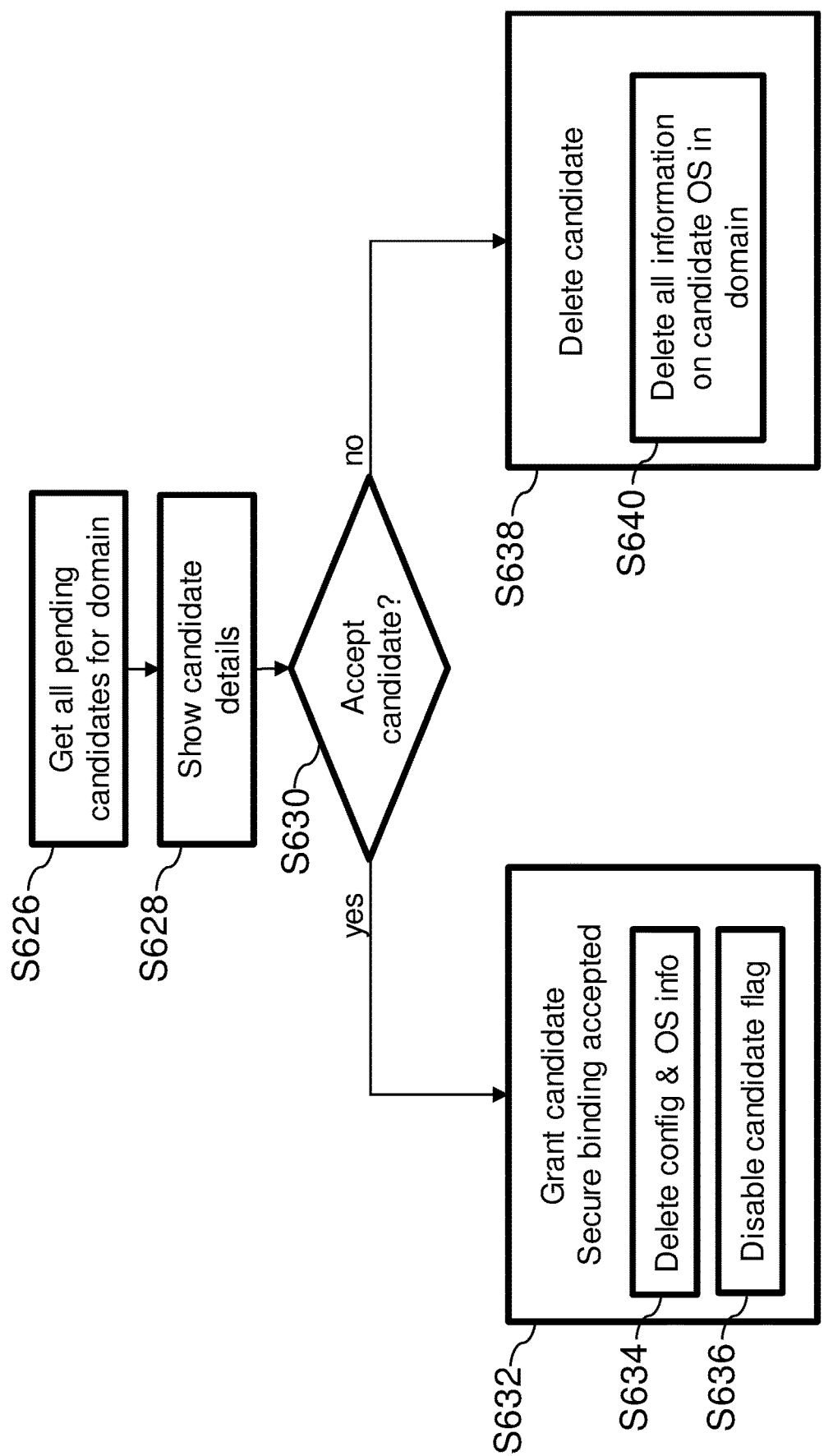
FIG. 7 depicts a flow chart for a granting procedure of access to secret data by the grant authority, according to an embodiment of the disclosure.

FIG. 7 depicts a flow chart for a granting procedure of access to secret data 40 by the grant authority 52 according to an embodiment of the invention.

The granting authority 52 allows sharing of domains 70, 72, 74 by providing respective operating system identifiers 20, 22, 24 of shared domains 70, 72, 74.

In step S626 all pending candidate virtual machines for crypto access are searched and the candidate details, e.g. configuration of the virtual machine, OS details, and certificate, are shown in step S628.

If the candidate is accepted in S630, the candidate is granted a secure binding extension accepted, step S632. Configuration and OS information is deleted, step S634, followed by disabling the candidate flag, step S636.

On a request for booting an operating system in a virtual machine 10, 12, 14 the shared flag 82, 83 is checked by verifying that one of the secure binding data 84, 86 matches with the requesting operating system and, if this is the case, granting access to the secret data 40.

If the candidate is not accepted in step S630, the candidate is deleted in step S638 by deleting all information on the operating system of the candidate in the domain 70.

Figure 8:
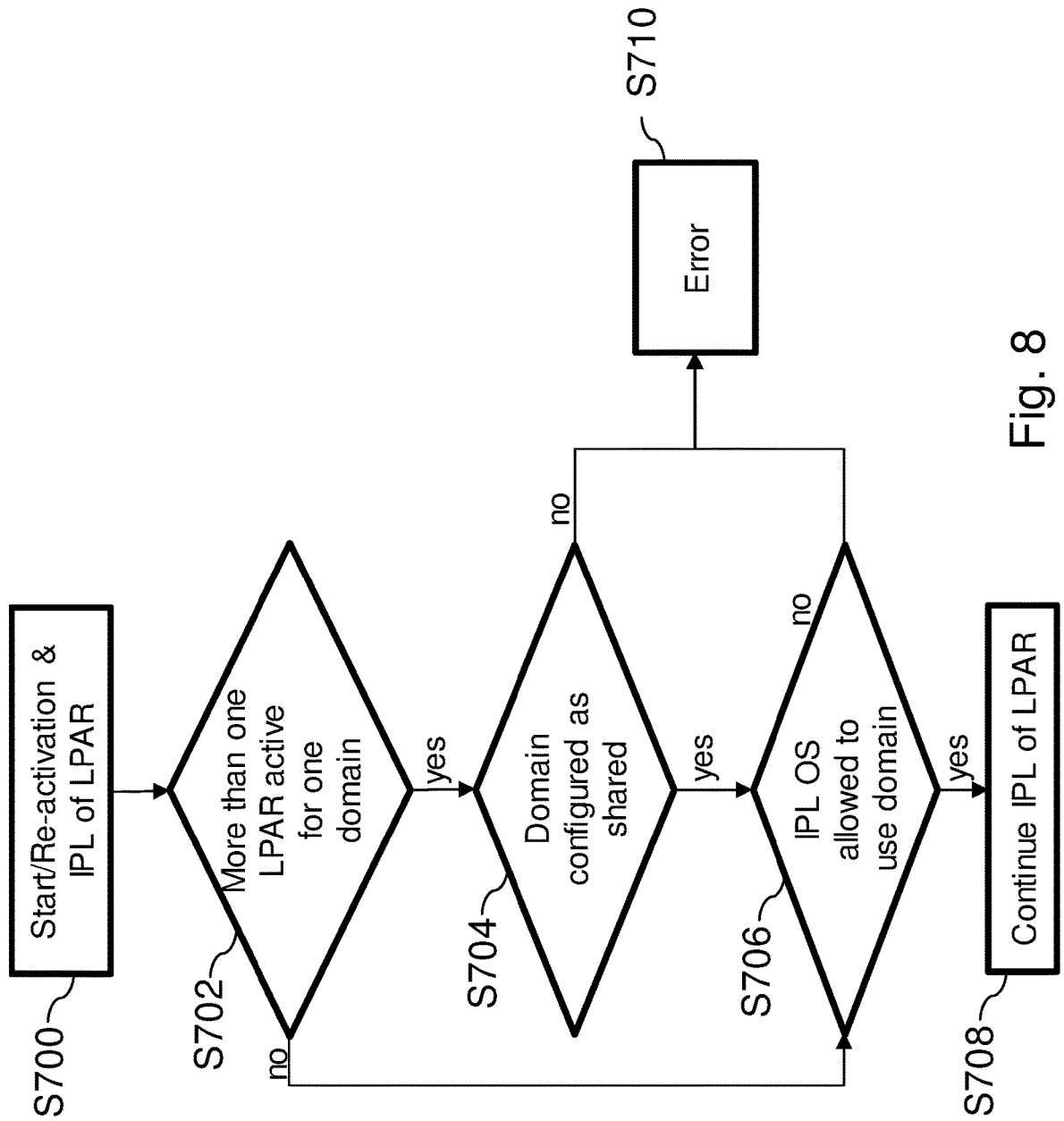
FIG. 8 depicts a flow chart for start/re-activation and initial program loading of a virtual machine, according to an embodiment of the disclosure.

FIG. 8 depicts a flow chart for start/re-activation and initial program loading of a virtual machine 10, 12, 14 according to an embodiment of the invention.

Start or re-activation and an initial program loading for a virtual machine 10, 12, 14 is started in step S700. Next, in step S702 it is checked if there is more than one virtual machine 10, 12, 14 active for one domain 70. If this is not the case, the program flow continues in step S706 by checking if an IPL OS is allowed to use the domain 70. If this is the case, IPL of the virtual machine 10, 12, 14 continues in step S708.

If there is only one domain 70 active (step S702), it is checked in step S704 if this domain 70 is configured as shared. If this is the case program flow continues in step S706 by checking if an IPL OS is allowed to use the domain 70.

If the domain is not configured as shared or IPL OS is not allowed to use the domain 70, program flow finishes with an error in step S710.

Figure 9:
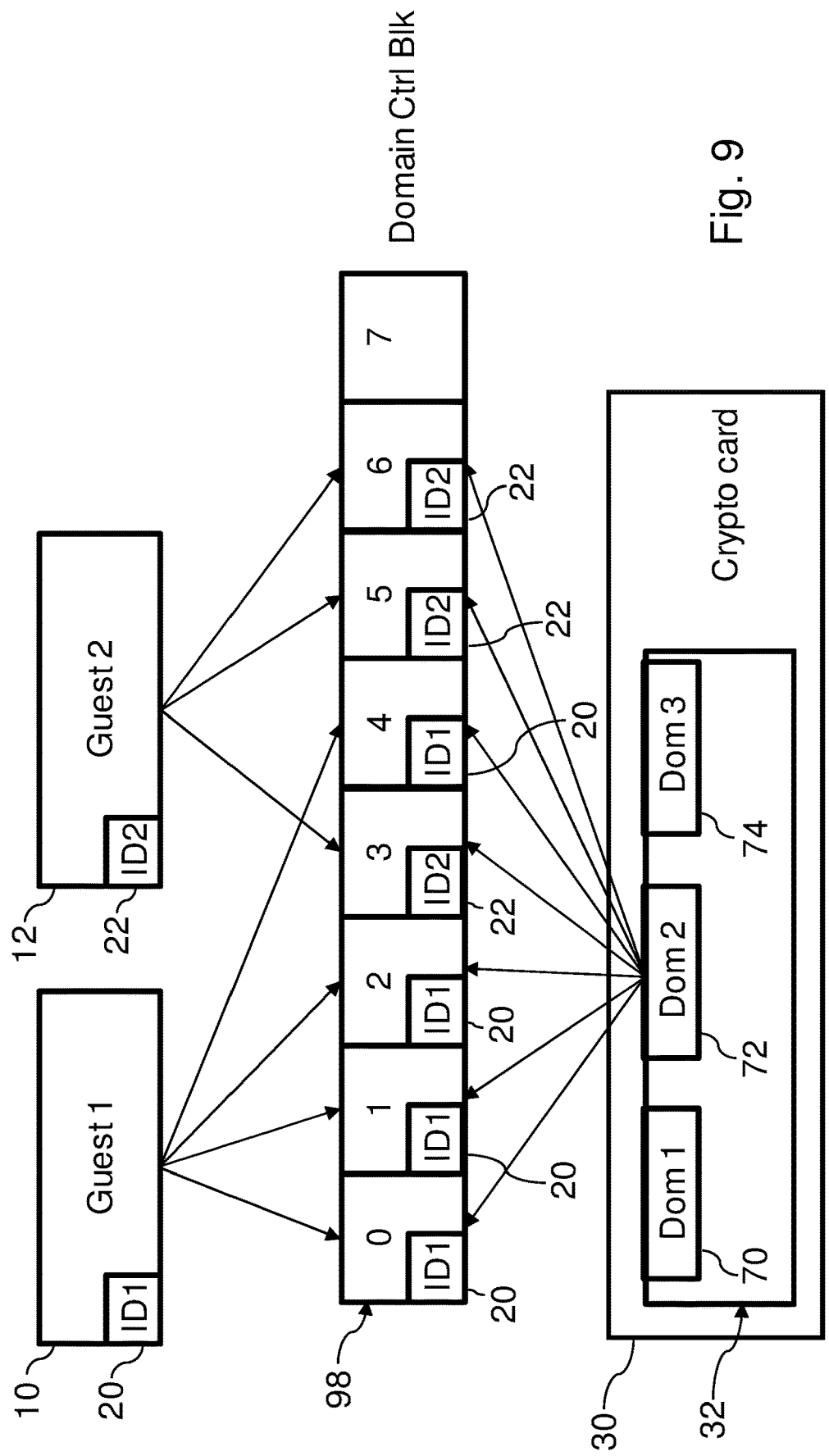
FIG. 9 depicts a firmware adjustment for secure domain sharing between two virtual machines, according to an embodiment of the disclosure.

FIG. 9 depicts a firmware adjustment for secure domain sharing between two virtual machines 10, 12 according to an embodiment of the invention.

The firmware 18 is adjusted by storing the operating system identifiers 20, 22 in a domain control block 98. The operating system identifiers 20, 22 are stored in different cells of the domain control block 98 indicating for which domain 70, 72, 74 operating systems of the virtual machines 10, 12 are granted for access.

Figure 10:
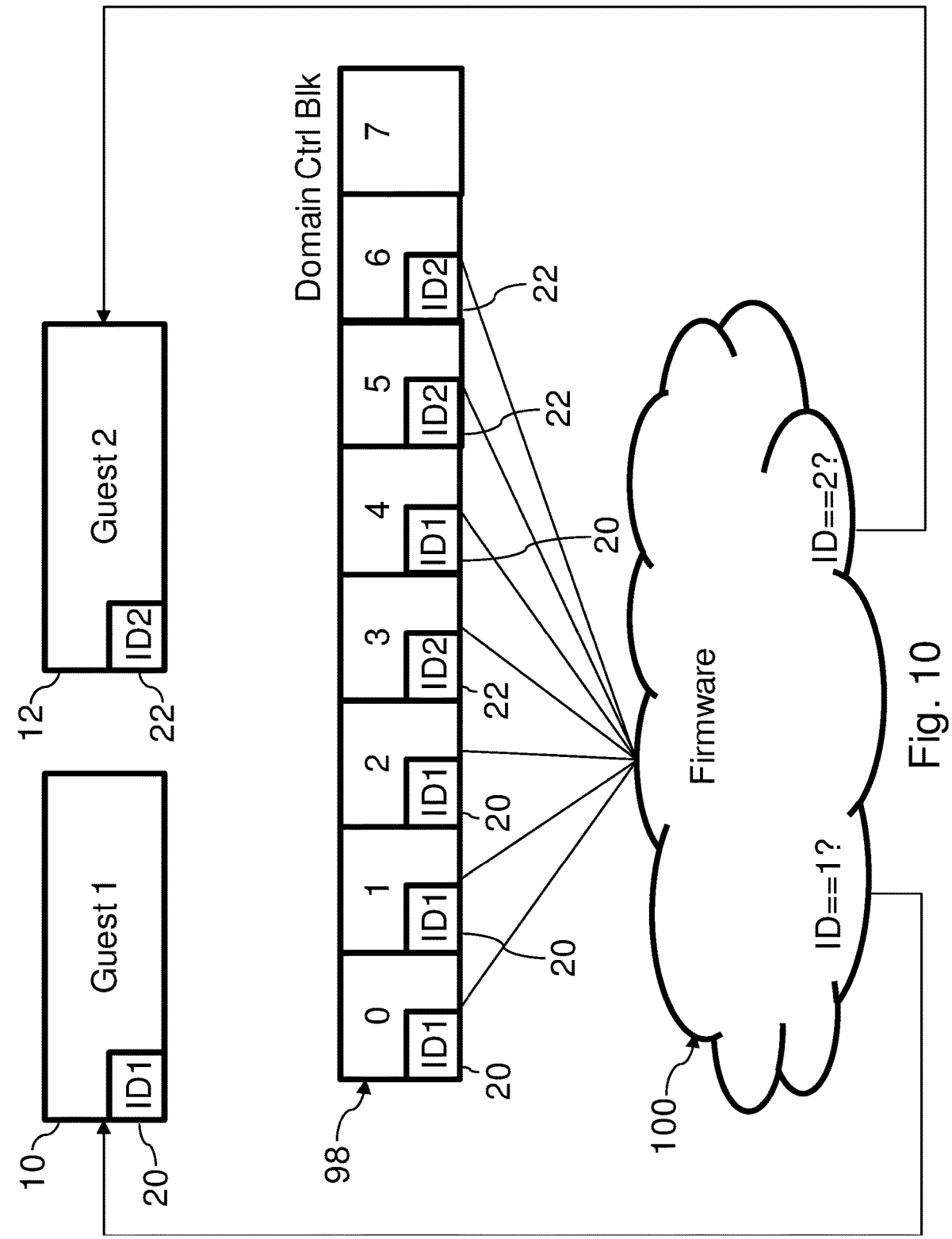
FIG. 10 depicts a firmware operation in the for secure domain sharing between two virtual machines, according to an embodiment of the disclosure.

FIG. 10 depicts a firmware operation for secure domain sharing between two virtual machines 10, 12 according to an embodiment of the invention.

The firmware 100 is reading the operating system identifiers 20, 22, 24 from the domain control block 98, thus being enabled to route replies from the hardware security module 30 to the virtual machines 10, 12 according to the operating system identifiers 20, 22. By this way the firmware 100 is now able to distinguish between the targets and routes the replies from the secure storage device 56 to the respective virtual machine 10, 12.

Figure 11:
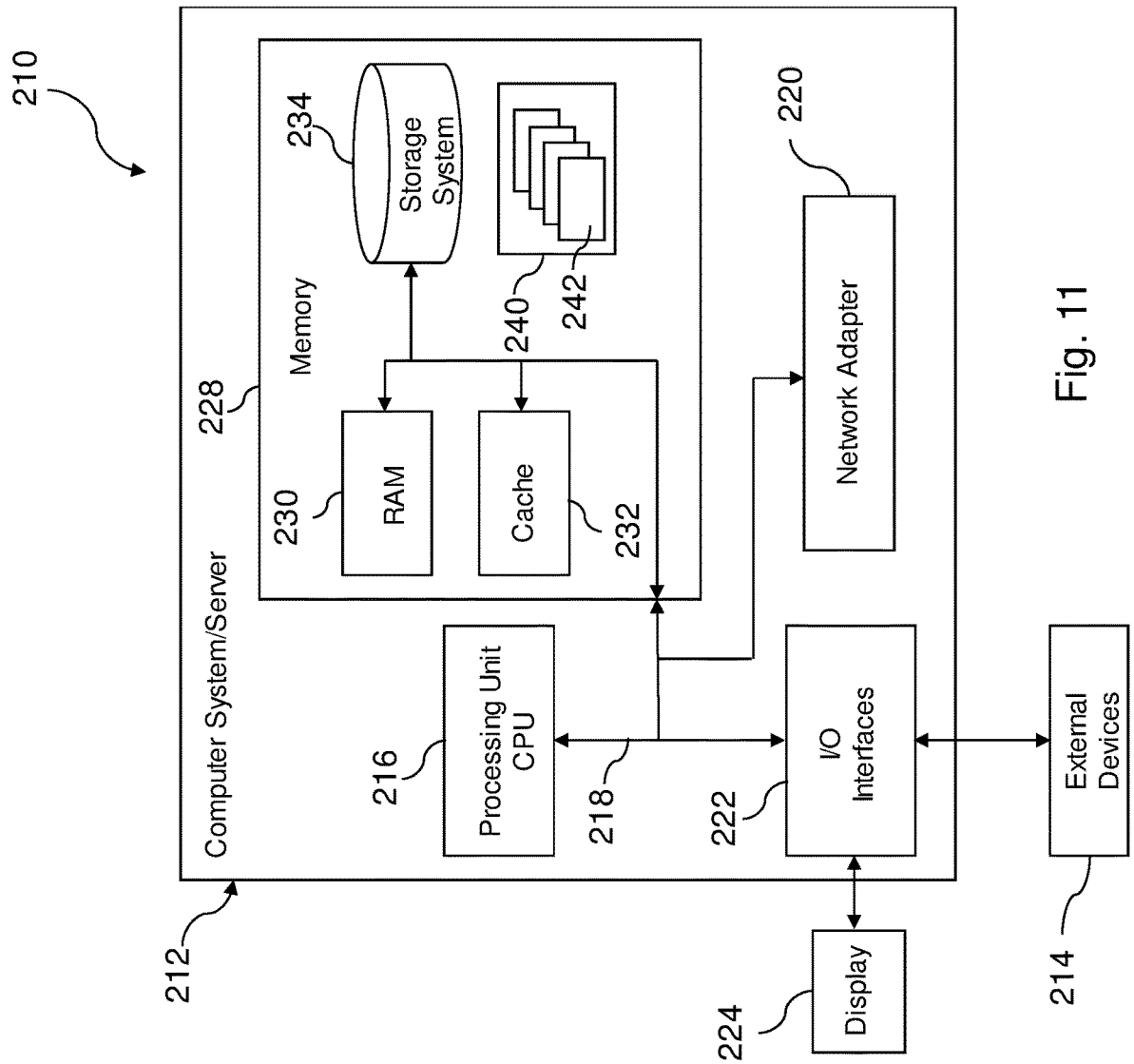
FIG. 11 depicts an example embodiment of a data processing system for executing a method according to an embodiment of the disclosure.

Referring now to FIG. 11, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sharing secret data among multiple containers, the method comprising:
   in response to initial booting of a first operating system instance in a container, generating a first unique operating system identifier for the first operating system instance;
   storing, by a grant authority, the first unique operating system identifier in a reserved area of a secure storage device;
   in response to a request from the operating system instance to access secret data in the secure storage device, determining, by the grant authority, the first unique operating system identifier is stored in the secure storage device;
   granting the operating system instance access to secret data in a non-reserved area of the secure storage device;
   in response to initial booting of a second operating system instance in a second container, generating a second unique operating system identifier for the second operating system instance;
   in response to a request to access secret data in the secure storage device, storing, by the grant authority, the second unique operating system identifier in the reserved area of the secure storage device;
   in response to a request from the second operating system instance to access secret data in the secure storage device, determining, by the grant authority, the unique operating system identifier for the second operating system instance is stored in the secure storage device; and granting the second operating system instance access to secret data in the non-reserved area of the secure storage device.

2. The method according to claim 1, further comprising: in response to a request to remove the assignment of the second operating system instance from the secure storage device, deleting, by the grant authority, the second unique identifier for the second operating system from the reserved area in the secure storage device.

3. The method according to claim 1, wherein the multiple containers include a plurality of virtual machines, wherein at least one virtual machine of the plurality is managed by a hypervisor.

4. The method according to claim 1, wherein the secure storage device includes a hardware security module with a memory.

5. The method according to claim 4, wherein the secret data are stored in at least one domain of the hardware security module, wherein the request from the first operating system instance to access the secret data is a request to assign a domain to the first operating system instance, wherein the first and second unique operating system identifiers are stored in a reserved area of the domain on the hardware security module; and wherein granting access to first and the second operating system instance is granting access to secret data in the non-reserved area of the first domain.

6. The method according to claim 4, further comprising: in response to a request to remove the assignment of the second operating system instance from a domain on the hardware security module, deleting, by the grant authority, the second unique identifier for the operating system from the reserved area in the domain.

7. The method according to claim 4, wherein a domain on the hardware security module is marked as shared by:
setting a trusted key entry flag to an "add" state; and
marking the domain as shared in a shared domain mask.

8. The method according to claim 4, further comprising: creating secure binding data together with the first unique operating system identifier in the reserved area in a domain on the hardware security module; and
setting a shared flag for the domain.

9. The method according to claim 5, wherein granting access for the first operating system instance to the secret data in the non-reserved area of the domain further comprises:
presenting the first unique operating system identifier to the grant authority; and
setting, by the grant authority, a trusted key entry flag to a "locked" state.

10. The method according to claim 8, wherein a firmware of a computer system provides secure binding data to the hardware security module for verification.

11. The method according to claim 8, further comprising:
removing the assignment of the second operating system instance from a domain on the hardware security module by:
deleting secure binding data from the reserved area;
verifying that the secret data has only been accessed by the second operating system instance; and
removing the secret data from the hardware security module.

12. The method according to claim 4, wherein the grant authority allows sharing of domains by providing respective unique operating system identifiers of the domains.

13. The method according to claim 8, further comprising:
in response to the request for initial booting of the first operating system in a virtual machine, checking the shared flag by verifying that secure binding data matches the first unique identifier of the requesting operating system instance; and
granting access to the secret data.

14. The method according to claim 10, wherein the firmware stores a set of unique operating system identifiers in a domain control block.

15. The method according to claim 13, wherein the firmware reads the set of unique operating system identifiers from the domain control block and routes replies from the hardware security module to the virtual machines, according to the set of unique operating system identifiers.

16. The method according to claim 1, further comprising:
generating a secure hash for the first operating system instance based on the first unique identifier of the operating system instance and domain specific cryptographic configuration data; and
using the secure hash to determine whether to grant access to the secret data.

17. The method according to claim 16, wherein a system firmware key is used for generating the secure hash.

18. The method according to claim 16, wherein cryptographic configuration data of a virtual machine is stored as the secure hash in the domain of the hardware security module.

19. A system for sharing secret data among multiple containers, the system comprising:
a memory; and
a processor in communication with the memory, wherein the computer system is configured to:
in response to initial booting of a first operating system instance in a container, generating a first unique operating system identifier for the first operating system instance;
storing, by a grant authority, the first unique operating system identifier in a reserved area of a secure storage device;
in response to a request from the operating system instance to access secret data in the secure storage device, determining, by the grant authority, the first unique operating system identifier is stored in the secure storage device;
granting the operating system instance access to secret data in a non-reserved area of the secure storage device;
in response to initial booting of a second operating system instance in a second container, generating a second unique operating system identifier for the second operating system instance;
in response to a request to access secret data in the secure storage device, storing, by the grant authority, the second unique operating system identifier in the reserved area of the secure storage device;
in response to a request from the second operating system instance to access secret data in the secure storage device, determining, by the grant authority, the unique operating system identifier for the second operating system instance is stored in the secure storage device; and granting the second operating system instance access to secret data in the non-reserved area of the secure storage device.

20. A computer program product for sharing secret data among multiple containers, the computer program product comprising a computer readable storage medium having program instructions embodied therewith, the program instructions executable by a device to cause the device to:

in response to initial booting of a first operating system instance in a container, generating a first unique operating system identifier for the first operating system instance;

storing, by a grant authority, the first unique operating system identifier in a reserved area of a secure storage device;

in response to a request from the operating system instance to access secret data in the secure storage device, determining, by the grant authority, the first unique operating system identifier is stored in the secure storage device;

granting the operating system instance access to secret data in a non-reserved area of the secure storage device;

in response to initial booting of a second operating system instance in a second container, generating a second unique operating system identifier for the second operating system instance;

in response to a request to access secret data in the secure storage device, storing, by the grant authority, the second unique operating system identifier in the reserved area of the secure storage device;

in response to a request from the second operating system instance to access secret data in the secure storage device, determining, by the grant authority, the unique operating system identifier for the second operating system instance is stored in the secure storage device; and granting the second operating system instance access to secret data in the non-reserved area of the secure storage device.

* * * * *